(12) United States Patent
Matt et al.

(10) Patent No.: US 11,064,652 B2
(45) Date of Patent: Jul. 20, 2021

(54) GROUND WORKING SYSTEM WITH AT LEAST ONE INTENSIVE ZONE

(71) Applicant: Andreas Stihl AG & Co. KG, Waiblingen (DE)

(72) Inventors: Sebastian Matt, Kufstein (AT); Samuel Zoettl, Birgitz (AT)

(73) Assignee: Andreas Stihl AG & Co. KG, Waiblingen (DE)

( * ) Notice: Subject to any disclaimer, the term of this patent is extended or adjusted under 35 U.S.C. 154(b) by 370 days.

(21) Appl. No.: 16/002,964

(22) Filed: Jun. 7, 2018

(65) Prior Publication Data

US 2018/0352729 A1    Dec. 13, 2018

(30) Foreign Application Priority Data

Jun. 9, 2017  (EP) ..................................... 17400032

(51) Int. Cl.
*A01D 34/00* (2006.01)
*G01D 1/00* (2006.01)
(Continued)

(52) U.S. Cl.
CPC ........... *A01D 34/008* (2013.01); *A01D 34/64* (2013.01); *A01B 69/008* (2013.01); *A01D 69/02* (2013.01);
(Continued)

(58) Field of Classification Search
CPC .. A01D 34/006; A01D 34/008; G05D 1/0088; G05D 2201/0208
See application file for complete search history.

(56) References Cited

U.S. PATENT DOCUMENTS

| 8,106,626 B2 | 1/2012 | Li et al. |
| 8,770,482 B2 | 7/2014 | Ackermann et al. |

(Continued)

FOREIGN PATENT DOCUMENTS

| CN | 101061946 A | 10/2007 |
| CN | 103853570 A | 6/2014 |

(Continued)

OTHER PUBLICATIONS

Anonymous: "Husqvarna Automower 230 ACX, Reviews—Product Review.com.au", May 18, 2016, XP055425034, pp. 1 to 10, URL:https://www.productreview.com.au/p/husqvarna-automower-230acx-220ac-210c/m/230acx.html.

(Continued)

*Primary Examiner* — Alicia Torres
(74) *Attorney, Agent, or Firm* — Walter Ottesen, P.A.

(57) ABSTRACT

A ground working system having at least one self-driving ground working device, wherein the ground working device has a drive, a control unit and an in-device battery for supplying energy to the ground working device. An operating region (A) determined by an edge boundary is provided for the ground working device, wherein the ground working device travels over an operating path (W) determined by the control unit within the operating region (A). In order to meet requirements for a differing working intensity of specific regions of an area, it is provided to predetermine at least one intensive limit, an intensive limit in each case demarcating an intensive region (B). The ground working device in an intensive mode works the intensive region (B) with preference.

18 Claims, 3 Drawing Sheets

(51) Int. Cl.
  *A01D 34/64* (2006.01)
  *A01D 69/02* (2006.01)
  *G05D 1/00* (2006.01)
  *A01D 101/00* (2006.01)
  *A01B 69/04* (2006.01)

(52) U.S. Cl.
  CPC ....... *A01D 2101/00* (2013.01); *G05D 1/0088* (2013.01); *G05D 2201/0208* (2013.01)

(56) References Cited

U.S. PATENT DOCUMENTS

| | | |
|---|---|---|
| 9,906,967 B2 | 2/2018 | Inoue et al. |
| 10,391,876 B2 | 8/2019 | Nordbruch |
| 2005/0230166 A1 | 10/2005 | Petersson et al. |
| 2006/0037560 A1 | 2/2006 | So |
| 2011/0153172 A1* | 6/2011 | Anderson ............ A01B 69/008 701/50 |
| 2011/0202307 A1 | 8/2011 | Petereit et al. |
| 2012/0158236 A1* | 6/2012 | Chung ................ A01D 34/008 701/25 |
| 2013/0006418 A1 | 1/2013 | Tian et al. |
| 2014/0324246 A1 | 10/2014 | Biber et al. |
| 2015/0328775 A1 | 11/2015 | Shamlian et al. |
| 2016/0014955 A1 | 1/2016 | Hans |
| 2017/0020064 A1 | 1/2017 | Doughty et al. |
| 2017/0215336 A1 | 8/2017 | Andriolo et al. |
| 2018/0255704 A1* | 9/2018 | Kamfors .............. G05D 1/0278 |
| 2018/0303031 A1* | 10/2018 | Araki .................... A01B 79/005 |
| 2018/0352728 A1 | 12/2018 | Ritzer et al. |
| 2018/0352733 A1 | 12/2018 | Matt et al. |
| 2018/0352734 A1 | 12/2018 | Matt et al. |
| 2018/0353040 A1 | 12/2018 | Matt et al. |

FOREIGN PATENT DOCUMENTS

| | | |
|---|---|---|
| CN | 203883787 U | 10/2014 |
| CN | 105359500 A | 2/2016 |
| DE | 202013101894 U1 | 9/2014 |
| DE | 102015114568 A1 | 3/2017 |
| EP | 1906205 A1 | 4/2008 |
| EP | 1933467 A2 | 6/2008 |
| EP | 2269433 A1 | 1/2011 |
| EP | 2390741 A2 | 11/2011 |
| EP | 2656718 A1 | 10/2013 |
| EP | 2658073 A1 | 10/2013 |
| EP | 2667271 A1 | 11/2013 |
| EP | 2945037 A2 | 11/2015 |
| EP | 3069593 A1 | 9/2016 |
| WO | 03104908 A1 | 12/2003 |
| WO | 2013/141206 A1 | 9/2013 |
| WO | 2014/086267 A1 | 6/2014 |
| WO | 2014158060 A1 | 10/2014 |
| WO | 2015072897 A1 | 5/2015 |
| WO | 2016102143 A1 | 6/2016 |
| WO | 2016103068 A1 | 6/2016 |
| WO | 2016/142101 A1 | 9/2016 |
| WO | 2016178616 A1 | 11/2016 |
| WO | 2018060966 A1 | 4/2018 |

OTHER PUBLICATIONS

Anonymous: "Rasenmaeher Roboter Signalverstaerker", May 17, 2016, XP055425027, pp. 1 to 7, URL:https://web.archive.org/web/20160517003655/http://robomaeher.de/blog/rasenmaher-roboter-signalverstarker/.

* cited by examiner

GROUND WORKING SYSTEM WITH AT LEAST ONE INTENSIVE ZONE

CROSS REFERENCE TO RELATED APPLICATION

This application claims priority of European patent application no. 17 400 032.3, filed Jun. 9, 2017, the entire content of which is incorporated herein by reference.

FIELD OF THE INVENTION

The invention relates to a ground working system comprising at least one self-driving ground working device, wherein the ground working device has a drive, a control unit and an in-device battery for supplying energy to the ground working device. An operating region for the ground working device is determined by an edge boundary, wherein this device travels over an operating path determined by the control unit within the operating region.

BACKGROUND OF THE INVENTION

It is known to operate a self-driving ground working device on an operating region that is bounded by a wire. The ground working device travels automatically within the operating region over a random, predetermined or automatically planned path. A base station of the ground working system is electrically connected to the wire and transmits on the wire a wire signal, the electromagnetic field of which induces a reception signal in a reception coil of the ground working device. The reception signal is processed in a control unit for controlling the ground working device and the ground working device is controlled correspondingly within the operating region.

Such ground working systems may comprise a single or multiple self-driving ground working devices, for example in order to work relatively large areas effectively.

If a ground working system, comprising in particular multiple lawnmowers working an operating area in a combined manner, is put into operation, it is assumed that a satisfactory result can be regularly achieved. In practice, however, in a relatively large area of lawn there are always regions in which the grass grows more vigourously than in other regions. In order also to work these regions of the area with more vigourous growth satisfactorily, usually the overall operating time of the system is increased.

SUMMARY OF THE INVENTION

It is an object of the invention to provide a ground working system comprising at least one ground working device configured in such a manner that different requirements for working the area are possible without significantly prolonging the overall operating time of the system.

The above object can, for example, be achieved by a ground working system having: at least one self-driving ground working device having a drive, a control unit and an in-device battery for supplying energy to the at least one self-driving ground working device, wherein an operating region (A) of the at least one self-driving ground working device is determined by an edge boundary; the at least one self-driving ground working device being configured to travel along a traveling path (W) determined by the control unit within the operating region (A); the ground working system having a predetermined intensive limit and the intensive limit demarcating an intensive region (B); and, the at least one self-driving ground working device, in an intensive mode, being configured to work the intensive region (B) with preference.

According to an aspect of the invention, at least one intensive limit, which demarcates an intensive region, is predetermined as required. The intensive region is the region that requires increased working of the area, the ground working device in an intensive mode working the intensive region with preference.

Advantageously, the ground working device will switch to the intensive mode when it passes over the set intensive limit. In this intensive mode, the ground working device is controlled in particular in such a way that it only operates within the set intensive limits of the intensive region.

The intensive mode allows an area region with an increased working requirement that is lying in the operating region to be marked and worked as desired in an easy way, without increasing the overall working time for the operating region to be worked. The ground working device brought into the intensive region will complete its traveling paths within the intensive limits, changing its direction in each case when it approaches or reaches the intensive limit, in order to remain within the intensive region. This intensive region preferably lies within the operating region; however, it may also be provided that the intensive region extends at least partially out of the operating region. Since the ground working device brought into the intensive region is not controlled exclusively on the basis of the intensive limit, an intensive zone/region extending out of the edge boundary cannot cause a problem. In this case, the edge boundary is given higher priority and, as a result, the intensive zone is restricted.

In an embodiment, it is provided that the ground working device switches to the intensive mode when it passes over the intensive limit. This expediently takes place when it passes over the intensive limit for the first time. Other triggers for activating the intensive mode are expedient.

It is also possible that multiple intensive zones are provided in the operating region. The coordinates of its intensive limit allow an intensive zone to be determined and distinguished from a second or further intensive zone. The working of multiple intensive zones may be performed one after the other by just one ground working device. It may also be expedient to divide the working of multiple intensive zones among multiple ground working devices operating in the ground working system.

An intensive mode activated in the ground working device is preferably ended after reaching a predetermined switch-off parameter. Such a switch-off parameter may be expediently determined on the basis of current operating data of the ground working device.

In a simple configuration, it is advantageously envisaged to choose the switch-off parameter as a predetermined time period. The intensive mode is ended after a predetermined time period, for example expediently after the time spent by the ground working device within the intensive region. This time period may be independent of the changes in direction of the ground working device within the intensive zone and only determined by the time spent by the ground working device within the intensive zone.

In a further embodiment, it is envisaged to set the switch-off parameter as a predetermined number of changes in direction of the ground working device within the intensive zone. If, for example, fifteen changes in direction are predetermined as the switch-off parameter, the intensive mode is ended after reaching the predetermined number of changes in direction. Whenever the ground working device reaches the intensive limit, it changes the traveling direction in order to remain within the intensive region. If the predetermined number of changes in direction have been performed, the intensive mode is ended. The actual time spent by the ground working device within the intensive zone may in this case vary.

It may also be provided to predetermine the switch-off parameter in the form of a distance covered, for example on the basis of the predetermined distance of the traveling path covered by the ground working device within the intensive zone.

In an embodiment, it is provided to describe completed working of a respective intensive zone via a state variable, which is stored in the ground working device. The state variable may be for example a set flag, which as a status indicator indicates whether working has been completed. If the status indicator has been set, for example set to "1", the ground working device is not switched once again to the intensive mode if it once again enters an intensive zone. Only if the flag has not been set, for example is "0", is it provided to switch to the intensive mode when it enters an intensive zone for working the intensive zone. According to an embodiment, the ground working device will switch to the intensive mode in dependence on the value of the state variable.

Advantageously, the state variable of the ground working device is reset in dependence on at least one operating variable of the ground working device. The state variable is advantageously reset by a predetermined value of a selected operating variable of the ground working device. In a first embodiment, the selected operating variable may be an operating time of the ground working device. In a second embodiment, the distance of the traveling path covered by the ground working device may be used as the selected operating variable. In a third embodiment, a number of changes in direction of the ground working device may be the selected operating variable. In a fourth embodiment, a number of times an intensive limit of an intensive zone is passed over by the ground working device may be used as the selected operating variable. The selected operating variables mentioned above as alternatives may also bring about a resetting of the state variable in any desired combination with one another.

The intensive limit may advantageously be formed by a virtual limit and is in particular set electronically. This may for example be a limit within a map stored in the ground working device, on the basis of the data of which the ground working device operates. A virtual limit is also possible by GPS satellite navigation, by radio beacons or similar locational determinations. It is advantageous that the virtual limit can be freely predetermined by a user and can be changed as required.

Advantageously, the intensive limit may also be formed by a physically laid wire as an edge boundary of an intensive region.

Expediently, the ground working device has a first navigation unit, interacting with the edge boundary of the operating region, and at least one further navigation unit, interacting with the intensive limit. Each navigation unit is advantageously connected to the control unit of the ground working device. The control unit advantageously forms a common control unit for the first and every further navigation unit.

It may also be provided that the ground working device uses a common navigation unit for the edge boundary and the intensive limit. Thus, for example, the edge boundary may be determined by GPS satellite navigation; the edge boundary of the operating region is consequently formed as a virtual limit. The virtual limit of the intensive region may likewise be predetermined by GPS satellite navigation. The data of the GPS satellite navigation are fed to the evaluation unit of the ground working device. It can be ascertained via the evaluation of the received satellite data whether the ground working device is traveling within the edge boundary of the operating region or already within the intensive limit of the intensive region.

In a simple configuration, the edge boundary of the operating region is formed by a wire. Transmitted on this wire is a wire signal, which induces a reception signal in a reception coil of the ground working device. The reception signal is used for controlling the ground working device within the operating region.

In an embodiment, the ground working device is a self-driving lawnmower.

In an embodiment, the operating region and the at least one intensive zone are worked by multiple ground working devices as a team. The control and management of the ground working system comprising multiple ground working devices takes place in particular via a central control unit such as a server. The control unit may be provided in a base station or a charging station of the ground working system. It may also be advantageous to use an external server as the central control unit.

Further advantageous embodiments are provided by any desired combination of the features specified and the embodiments described.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
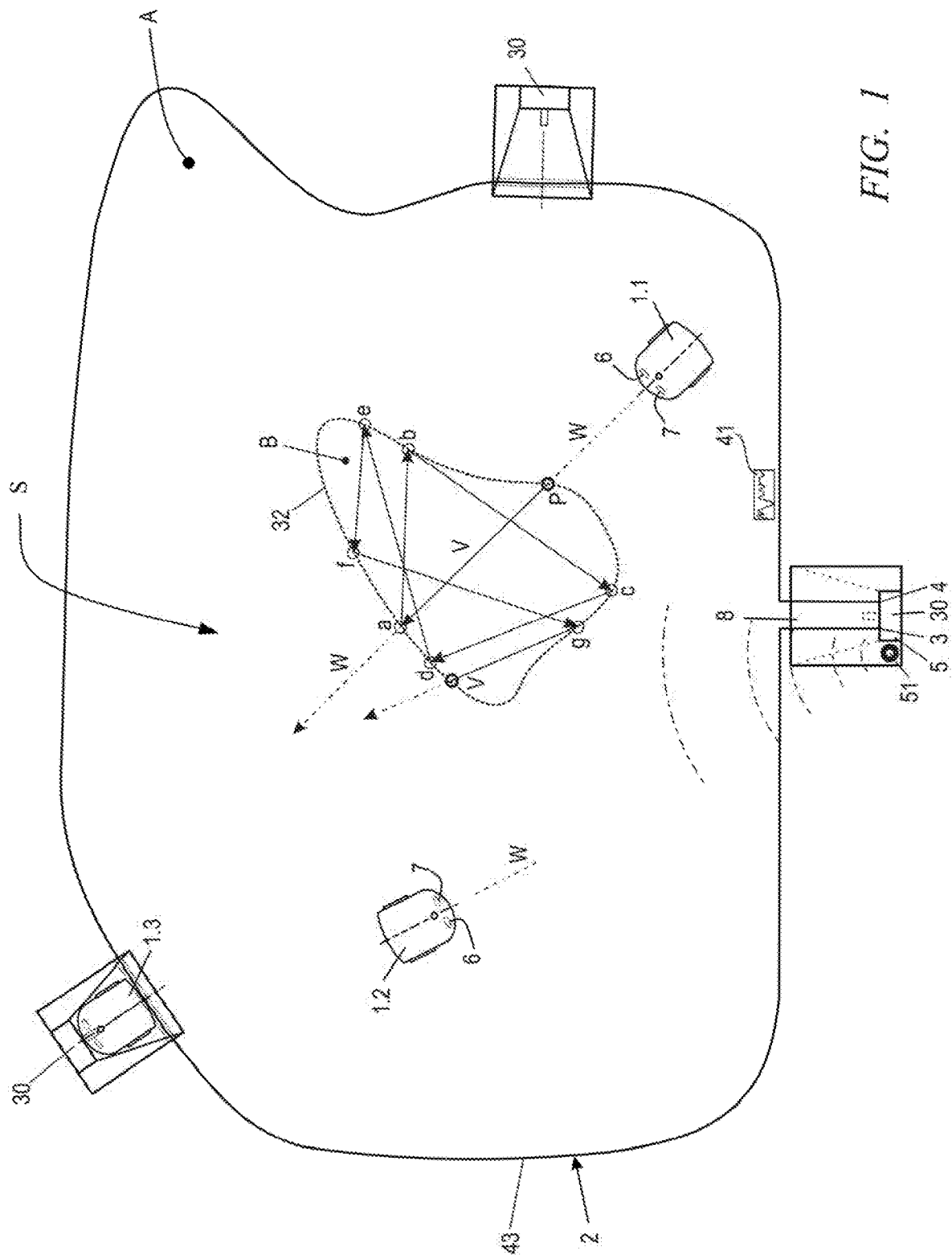
FIG. 1 shows in a schematic representation a ground working system with at least one ground working device driving itself in an operating region.

The ground working system S represented in FIG. 1 comprises at least one self-driving ground working device 1.1, 1.2 and 1.3 for working a predetermined operating region A. In the embodiment, multiple, in particular three, ground working devices 1.1, 1.2 and 1.3 are shown for the combined working of the predetermined operating region A. The ground working device 1.3 is shown as having entered a charging station 30. The ground working system S may comprise fewer or more ground working devices. Each individual ground working device 1.1, 1.2 and 1.3 operates autonomously and travels automatically within the operating region A along a random, predetermined or automatically planned operating path W.

In the embodiment shown, as in FIG. 1, the operating region A of the ground working system S is determined by an edge boundary 2. The edge boundary 2 may be variously formed. Thus, the edge boundary 2 may be formed by map coordinates of a map stored in the ground working device, by radio beacons, by GPS satellites or the like. In the embodiment, the edge boundary 2 is formed by a physical wire 43. The wire 43 shown by way of example has been laid in particular as a closed wire loop, the ends 3, 4 of the wire loop being connected to a transmission unit 5 of a base station 8. The transmission unit 5 transmits electrical wire signals 41—preferably at fixed time intervals—onto the wire 43. The wire signals 41 bring about an electromagnetic field, which is received by reception coils 6 and 7 within the operating region A of a ground working device 1.1, 1.2, 1.3.

In FIG. 1, the base station 8 is configured as a charging station 30. As FIG. 1 shows, further charging stations 30 are provided along the edge boundary 2 formed as a wire 43.

Figure 2:
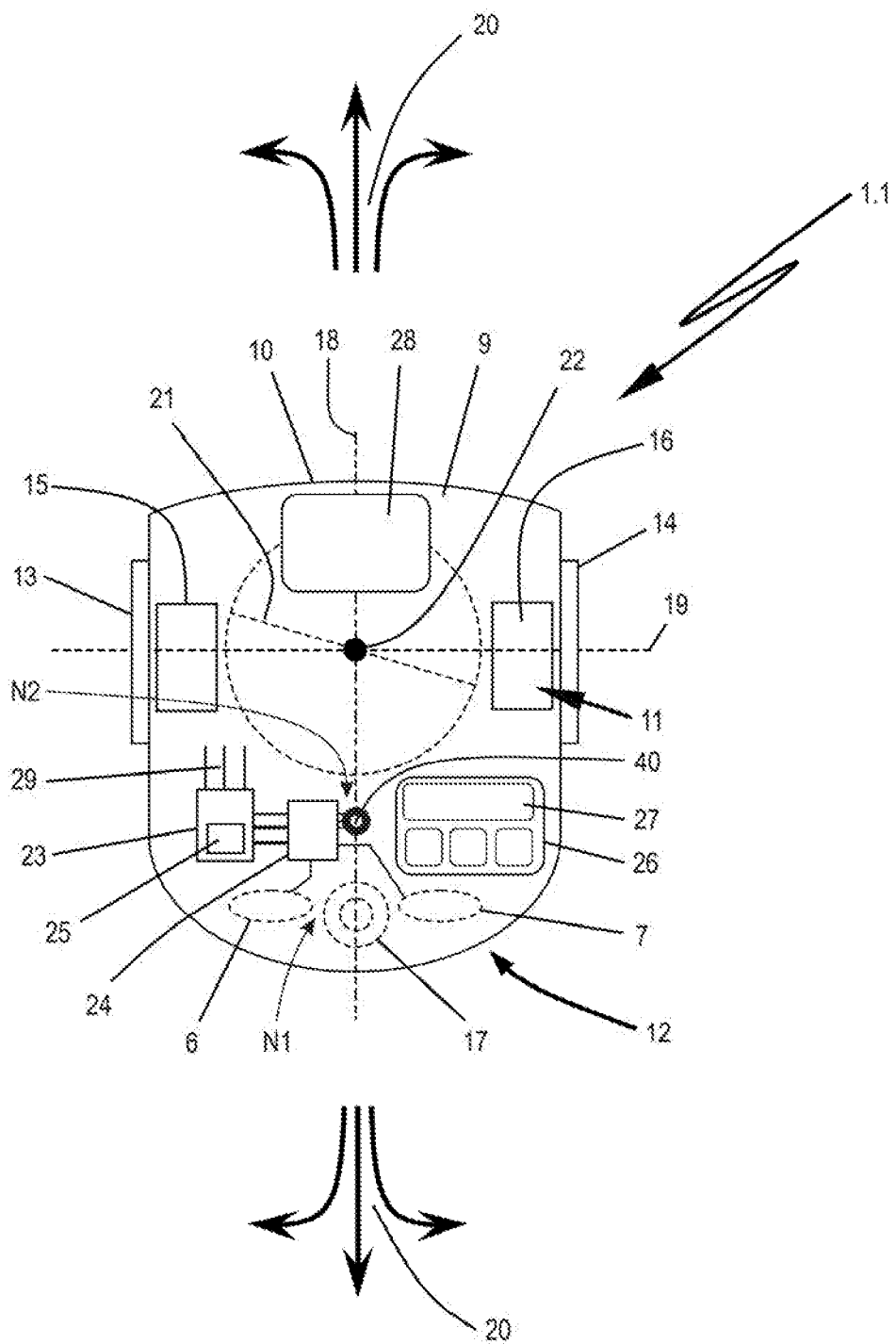
FIG. 2 shows in a schematic representation the construction of a ground working device in the example of a self-driving lawnmower; and, FIG. 3 shows in a schematic representation the predetermination of an intensive limit for determining an intensive zone.

Schematically shown in plan view in FIG. 2 is a ground working device 1.1, which is configured as a lawnmower 10. The representation of the autonomously operating, self-driving lawnmower 10 is given by way of example. The ground working device 1.1 may also be configured as a scarifier, road sweeper, vacuum cleaner, autonomous ride-on lawnmower or similar ground working device.

The ground working device 1.1 shown in FIG. 2 as a lawnmower 10 consists essentially of a chassis with rear drive wheels 13, 14 with a drive 11. In the embodiment, each drive wheel 13, 14 is assigned an electrical drive motor 15, 16, so that the drive wheels 13 and 14 can be driven at different rotational speeds and/or in different directions of rotation for controlling the direction of the lawnmower 10. The drive 11 consists of two mutually independently controllable electric motors.

Provided in the front region 12 of the housing 9 of the ground working device 1.1, there is an in particular self-aligning third wheel 17. The third wheel 17 preferably lies on a longitudinal mid-axis 18 of the housing 9. The configuration of a chassis frame with four wheels may be expedient.

The drive wheels 13, 14 of the ground working device 1.1 shown rotate about a common drive axis 19. The drive axis 19—in the plan view of the lawnmower 10 as in FIG. 2—is in particular perpendicular to the longitudinal mid-axis 18 of the housing 9. For traveling in a straight line, the drive wheels 13 and 14 are to be driven synchronously via their electrical drive motors 15 and 16. For negotiating a curve, the drive wheels 13, 14 are driven for example with different rotational speeds by their drive motors 15, 16. By means of the drive 11, the ground working device 1.1 can be moved in any desired traveling direction 20 forwards or backwards according to the arrows depicted.

In the embodiment as in FIG. 2, the ground working device 1.1 has an operating tool 21 between the drive wheels 13 and 14. In the embodiment as a lawnmower 10, the operating tool 21 is a blade rotating about a vertical rotation axis 22.

The control of the electrical drive motors 15 and 16 for moving the ground working device 1.1 on an operating path W is carried out via a control unit 23, which is connected via schematically indicated electrical lines 29 to the electrical drive motors 15 and 16.

The wire signal 41 transmitted on the wire loop of the wire 43 is received in the reception coils 6 and 7 of the ground working device 1.1. The reception coils 6 and 7 lie in the front region 12 of the housing 9, respectively on one side of the longitudinal mid-axis 18 of the ground working device 1.1. The reception signals induced in the reception coils 6 and 7 are delivered to a common evaluation unit 24, which is connected to the control unit 23. The reception coils 6 and 7 form together with the evaluation unit 24 a first navigation unit N1 of the ground working device 1.1.

Advantageously, the control unit 23 comprises a memory 25 for an operating variable, which is expedient for operating the ground working device 1.1. Such an operating variable may be for example the start time of the operation, the overall duration of the operation, the cutting height (in the case of a configuration as a lawnmower), the traveling distance to a charging station, a mowing schedule as a weekly schedule or a similar operating variable.

In FIG. 2, an input pad 26, which advantageously has a screen 27 and input keys, is provided for the user to enter information about the operating variable. It may be expedient to configure the screen as a touchscreen, so that it is possible to dispense with input keys.

The ground working device 1.1 according to FIG. 2 also has a further receiver 40, which together with the evaluation unit 24 and the control unit 23 forms a further navigation unit N2. The receiver 40 advantageously receives radio signals from radio beacons, satellite data for GPS navigation or the like. The communication connection of the receiver 40 to a transmitter may also be as a WLAN connection, Bluetooth connection, GSM connection, NFC connection or similar wireless connections, in particular near-field connections.

The ground working devices 1.1, 1.2, 1.3 may in particular be configured such that they communicate, for example via a radio connection, with a control unit 51, which makes central management and control of the ground working devices 1.1, 1.2, 1.3 possible. The control unit 51 may be provided in a base station 8 or a charging station of the ground working system S, as FIG. 1 shows. A higher-level, external server may also be advantageous, in order to enter, renew or adapt operating variables of the individual ground working device 1.1, 1.2, 1.3 from the central control unit 51.

The electrical supply to the control unit 23 and to all its components, the electrical supply to the electrical drive 11 and also the electrical supply to the receiver 40 is ensured by an in-device battery 28. The battery 28 is preferably inserted in the housing 9 of the ground working device 1.1. During the operation of the ground working system S, a ground working device 1.1, 1.2 and 1.3 is made to travel on an operating path W independently of one another in the maximum operating region A to be worked, as a result of corresponding control of the drive motors 15 and 16. Each individual ground working device 1.1, 1.2 and 1.3 operates autonomously in accordance with the information of an operating variable stored in its memory 25.

As shown in FIG. 1, an intensive region B is preferably formed within the operating region A. The intensive region B is determined by an intensive limit 32. In the embodiment shown, the intensive limit 32 is closed, so that an intensive region B completely surrounded by the intensive limit 32 is obtained. Multiple intensive regions may be provided within an operating region A. An overlapping of intensive regions may be expedient. In the case of overlapping intensive regions, a zone covered by two intensive regions may be worked with increased working effort.

In an advantageous configuration, the intensive limit 32 is a virtual limit, which can be changed at any time by the user. It may be expedient to determine an intensive limit by a physically laid wire, in particular if the intensive region is intended to remain unchanged.

A virtual limit is set electronically, for which purpose the user 31 (FIG. 3) can make use of electronic aids 33. Such electronic aids 33 may be an electronic operator control element, a smartphone, a tablet or similar modern means of communication.

Figure 3:
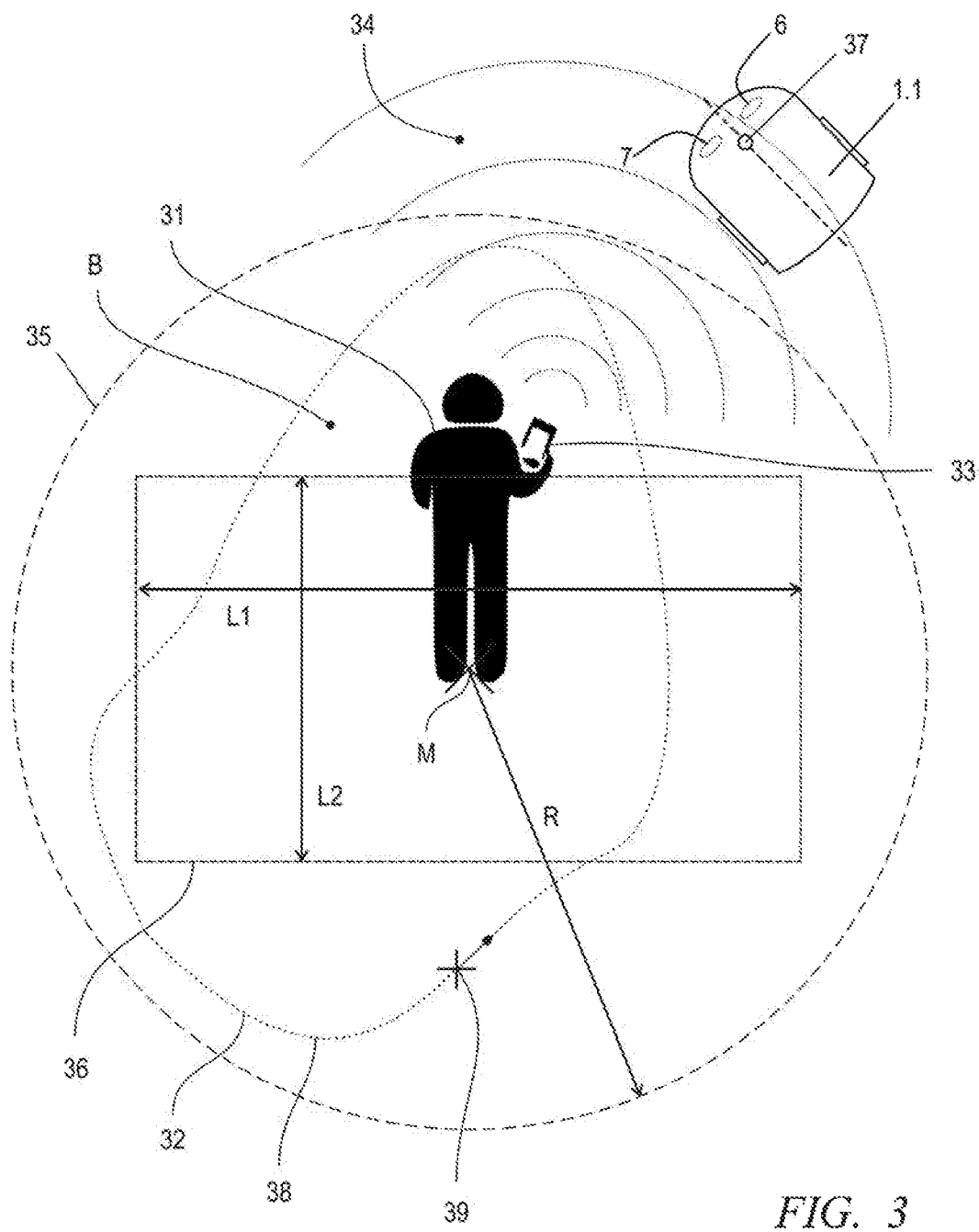

In a simple embodiment, the user 31 uses a smartphone as an electronic aid 33, and starts the locational determination on it by activating the GPS satellite navigation, as FIG. 3 shows. Then, the user determines an intensive zone, with for example a circular basic form 35, by operating an application started on the smartphone. To this end, the user 31 may for example enter the radius R of the circle around his standpoint M. After setting the intensive zone on the electronic aid 33, the GPS data generated by the application are transmitted wirelessly by radio connection 34 to a suitable receiver 37 of the ground working device 1.1. The data obtained via the radio connection are stored in the memory 25 as the intensive region B to be observed.

As FIG. 3 also shows, the user may also define—with respect to his standpoint M—an intensive region in a rectangular basic form 36, by entering into the application the side lengths L1 and L2 of the rectangle. The transmission of the intensive limits 32 of the intensive region in the basic form 36 of a rectangle takes place—as described above—via the radio connection 34.

The application on the electronic aid 33, in particular a smartphone or a tablet, may also be configured such that an intensive region B of any desired basic form 38 can be formed. Thus, for example, with the GPS data acquisition activated, the user may, starting from a starting point 39, walk along the desired intensive limit 32 in the direction of the arrow from the starting point 39 until he returns to the starting point 39. The application generates a corresponding track, which is transmitted as an intensive limit 32 of the intensive region B via the radio connection 34 to the ground working device 1.1.

In a ground working system S, one or more ground working devices 1.1, 1.2 and 1.3 may operate, in particular as a team. It may be sufficient to enter the intensive limit 32 predetermined for the definition of the intensive region B only on one ground working device 1.1. This has the consequence that the ground working devices 1.2 and 1.3 ignore the intensive region B. If, on the other hand, the ground working device 1.1 passes over the intensive limit 32 at the point P, the control unit 23 switches over to an intensive mode.

In particular if the operating region A and the at least one intensive zone B are being worked by multiple ground working devices 1.1, 1.2, 1.3, the control and management of the multiple ground working devices 1.1, 1.2, 1.3 is expediently performed via a central control unit, which may for example be configured as a server. Thus, a team comprising a desired number of ground working devices 1.1, 1.2, 1.3 may be managed via a central server, for example the distribution of the frequencies with which intensive zones B are worked in accordance with the number of ground working devices 1.1, 1.2, 1.3 available in the operating region A. Also, by means of communication between the ground working devices 1.1, 1.2, 1.3 and for example a server as a central control unit of the team, an adaptation of the operating times can be performed, as can a change of operating variables stored in the ground working device 1.1, 1.2, 1.3.

In the intensive mode, the ground working device 1.1 is controlled in such a way that it operates in particular exclusively within the intensive limit 32 of the intensive region B. This switching over to the intensive mode takes place in the embodiment shown when the intensive limit 32 is passed over for the first time at the point P.

The ground working device 1.1 operates within the intensive region B in a way corresponding to how it operates in the maximum operating region A. The control is performed however such that the electronically set intensive limit 32 is not passed over; the ground working device 1.1 consequently moves automatically within the intensive region B on a random, predetermined or automatically planned path. In this case, when it approaches the intensive limit 32, but at the latest when it reaches the intensive limit 32, a change in direction takes place, as shown by the directional arrows depicted in FIG. 1.

An intensive mode switched in the ground working device 1.1 is ended in particular after reaching a predetermined switch-off parameter that is expediently stored in the ground working device 1.1. In a simple configuration, the switch-off parameter is chosen as a predetermined time period. The intensive mode is ended after a predetermined time period, for example expediently after the time spent by the ground working device 1.1 within the intensive region B. The intensive mode may be ended after a time period predetermined by the user. This time period may for example be started when the ground working device 1.1 passes over the intensive limit 32 for the first time at the point P. By way of example, a time period is for example 3 minutes to 10 minutes. This time period may be independent of the changes in direction of the ground working device within the intensive zone B and be determined only by the time spent by the ground working device 1.1 within the intensive zone.

The switch-off parameter may also be determined on the basis of current operating date of the ground working device 1.1. Thus, a switch-off parameter may be set as a predetermined number of changes in direction of the ground working device within the intensive zone B. If, for example, fifteen changes in direction are predetermined as the switch-off parameter, the intensive mode is ended after reaching the predetermined number of changes in direction. Whenever the ground working device reaches the intensive limit, it will change the direction of travel, in order to remain within the intensive region. If the predetermined number of changes in direction has been completed, the intensive mode is ended. The actual time spent by the ground working device within the intensive zone may in this case vary.

In an embodiment, after the switching on of the intensive mode by passing over the point P of the intensive limit 32, a counter provided in the ground working device is activated. This counter—preferably integrated in the control unit 23—may expediently count back from a predetermined counter reading to "zero". In the embodiment shown, the counter is counted down by one increment with each change in direction. Consequently, if the ground working device 1.1 travels on its operating path W up to the turning point a, a first change in direction takes place in the direction of the turning point b. At b, a second change in direction takes place to the turning point c. There, a third change in direction takes place to the turning point d, and further changes in direction to the turning points e, f and g. If at the start the counter is set for example to the number "7", the counter is counted downwards by an increment at each turning point, so that, after seven changes in direction at the turning points a to g, the intensive mode is ended. On its traveling path from the turning point g to the intensive limit 32, it will leave the intensive region B at the point V. The intensive region has been worked.

It may also be provided to predetermine the switch-off parameter in the form of a distance covered, for example on the basis of the predetermined distance of the traveling path covered by the ground working device 1.1 within the intensive zone B.

If, during its further operation in the operating region A, the ground working device 1.1 passes once again over the intensive limit 32, no reaction of the ground working device takes place. According to the embodiment, switching to the intensive mode will take place when and only when the ground working device 1.1 passes over the intensive limit 32 for the first time. Passing over it for a second, third, fourth time, et cetera, does not result in switching over to the intensive mode of the ground working device.

To this end, it may be provided in an embodiment to describe completed working of a respective intensive zone B via a state variable, which is stored in the ground working device, for example in the memory 25. The state variable may be for example a set flag, which as a status indicator indicates whether working has been completed. If the status indicator has been set, for example set to "1", the ground working device is not switched once again to the intensive mode if it once again enters an intensive zone. Only if the flag has not been set, for example is "0", switching to the intensive mode occurs when entering an intensive zone for working the intensive zone. The ground working device will only switch to the intensive mode in dependence on the value of the state variable.

Advantageously, the stored state variable of the ground working device 1.1 is reset in dependence on at least one operating variable of the ground working device 1.1. The state variable is advantageously reset by a predetermined value of a selected operating variable of the ground working device 1.1. In a first embodiment, the selected operating variable may be an operating time of the ground working device 1.1. In a second embodiment, the distance of the traveling path covered by the ground working device 1.1 may be used as the selected operating variable. In a third embodiment, a number of changes in direction of the ground working device 1.1 may be the selected operating variable. In a fourth embodiment, a number of times an intensive limit 32 of an intensive zone B is passed over by the ground working device 1.1 may be used as the selected operating variable. The selected operating variables of the working device 1.1 mentioned above as alternatives may also bring about a resetting of the state variable in any desired combination with one another.

In a further configuration, during the operation of the ground working system S, the intensive mode may be started once again each time the ground working system S is once again put into operation. It may also be expedient to deactivate the intensive mode once again in dependence on a predetermined operating time, to then activate it again when the intensive limit 32 is passed over for the first time.

Further advantageous embodiments are provided by any desired combination of the features specified and the embodiments described.

It is understood that the foregoing description is that of the preferred embodiments of the invention and that various changes and modifications may be made thereto without departing from the spirit and scope of the invention as defined in the appended claims.

What is claimed is:

1. A ground working system comprising:
   at least one self-driving ground working device having a drive, a control unit and an in-device battery for supplying energy to said at least one self-driving ground working device, wherein an operating region (A) of said at least one self-driving ground working device is determined by an edge boundary;
   said at least one self-driving ground working device being configured to travel along a traveling path (W) determined by said control unit within said operating region (A);
   the ground working system having a predetermined intensive limit and said intensive limit demarcating an intensive region (B); and,
   said at least one self-driving ground working device, in an intensive mode, being configured to work said intensive region (B) with preference, wherein said at least one self-driving ground working device is configured to store a completed working of said intensive region (B) in said at least one self-driving ground working device with a state variable, wherein the state variable is a set flag, which as a status indicator indicates whether working has been completed, wherein said at least one self-driving ground working device switches to the intensive mode in dependence on said state variable.

2. The ground working system of claim 1, wherein said at least one self-driving ground working device switches to the intensive mode when it passes over said intensive limit.

3. The ground working system of claim 1, wherein said at least one self-driving ground working device is controlled in the intensive mode in such a manner that said at least one self-driving ground working device operates within said intensive limit in said intensive region (B).

4. The ground working system of claim 1, wherein said intensive region (B) lies within said operating region (A).

5. The ground working system of claim 1, wherein said at least one self-driving ground working device switches to the intensive mode when it passes over said intensive limit for a first time.

6. The ground working system of claim 1, wherein said intensive mode of said at least one self-driving ground working device is ended after reaching a predetermined switch-off parameter.

7. The ground working system of claim 6, wherein said switch-off parameter is at least one of a predetermined time period, a predetermined number of changes in direction of said at least one self-driving ground working device within said intensive region (B) and a predetermined distance of said traveling path (W) covered by said at least one self-driving ground working device within said intensive region (B).

8. The ground working system of claim 1, wherein said state variable of said at least one self-driving ground working device is reset in dependence on selected operating variables of said at least one self-driving ground working device.

9. The ground working system of claim 8, wherein said selected operating variables are formed by at least one of an operating time of said at least one self-driving ground working device, a distance of the traveling path (W) covered by said at least one self-driving ground working device, a number of changes in direction of said at least one self-driving ground working device and a number of times an intensive limit of said intensive region (B) is passed over by said at least one self-driving ground working device.

10. The ground working system of claim 1, wherein said intensive limit is an electronically set, virtual limit.

11. The ground working system of claim 1, further comprising:
    a physically laid wire; and,
    said intensive limit being formed by said physically laid wire.

12. The ground working system of claim 1, wherein:
    said at least one self-driving ground working device has a first navigation unit configured to interact with said edge boundary of said operating region (A) and has at least one further navigation unit configured to interact with said intensive limit,
    said control unit is a common device control unit; and,
    said first navigation unit and said further navigation unit are connected to said common device control unit.

13. The ground working system of claim 1 further comprising a common navigation unit for said edge boundary and said intensive limit.

14. The ground working system of claim 1 further comprising:
- a laid wire configured to have a wire signal transmitted thereon;
- said at least one self-driving ground working device having a reception coil; and,
- said wire signal being configured to induce a reception signal in said reception coil and said reception signal being used for controlling said at least one self-driving ground working device within the operating region (A).

15. The ground working system of claim 1, wherein said at least one self-driving ground working device is a self-driving lawnmower.

16. The ground working system of claim 15 further comprising:
- a central control unit;
- the ground working system including a plurality of said self-driving ground working devices;
- wherein said plurality of self-driving ground working devices work said operating region (A) and said intensive region (B); and,
- said central control unit is configured to manage said plurality of self-driving ground working devices.

17. The ground working system of claim 1, wherein said at least one self-driving ground working device has a first navigation unit configured to interact with said edge boundary of said operating region (A) and has at least one further navigation unit configured to interact with said intensive limit.

18. The ground working system of claim 1 further comprising:
- a laid wire; and,
- said edge boundary of said operating region (A) being formed by said laid wire.

* * * * *